(12) United States Patent
Bansal et al.

(10) Patent No.: US 8,676,903 B2
(45) Date of Patent: Mar. 18, 2014

(54) SYSTEM AND METHOD TO CONTROL EMAIL WHITELISTS

(75) Inventors: Ravi P. Bansal, Tampa, FL (US); Rick A. Hamilton, II, Charlottesville, VA (US); Brian M. O'Connell, Cary, NC (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 12/175,005

(22) Filed: Jul. 17, 2008

(65) Prior Publication Data

US 2010/0017360 A1  Jan. 21, 2010

(51) Int. Cl.
*G06F 15/16* (2006.01)
(52) U.S. Cl.
USPC .......................................................... 709/206

(58) Field of Classification Search
USPC .......................................................... 709/206
See application file for complete search history.

(56) References Cited

U.S. PATENT DOCUMENTS

| 6,804,704 | B1 * | 10/2004 | Bates et al. | 709/217 |
| 2005/0015448 | A1 * | 1/2005 | Smith et al. | 709/206 |
| 2006/0253446 | A1 * | 11/2006 | Leong et al. | 707/9 |
| 2007/0078936 | A1 * | 4/2007 | Quinlan et al. | 709/206 |

* cited by examiner

*Primary Examiner* — David X Yi
(74) *Attorney, Agent, or Firm* — Mark Vallone; Nicholas L. Cadmus

(57) ABSTRACT

A system and method to control email whitelists by collecting one or more website email addresses parsed from a web page, detecting whether one or more of the user's email addresses are included in a webform of the web page, confirming whether the collected one or more website email addresses are to be added to one or more email whitelists, and updating the configuration of the one or more whitelists in response to a confirmation to add the one or more site email addresses to the one or more email whitelists.

17 Claims, 3 Drawing Sheets

SYSTEM AND METHOD TO CONTROL EMAIL WHITELISTS

BACKGROUND OF THE INVENTION

1. Technical Field

The present invention generally relates to a spam control system, and in particular, the present invention relates to an improved system and method to control email whitelists.

2. Description of the Related Art

Many users of email use blacklists and whitelists included within their email software to control undesired spam, or junk, email from undesired email sources. A blacklist is a list of email addresses or domain names from which email is blocked. A whitelist is a list of email addresses or domain names from which email is allowed.

Typically, an email user's email software may provide a feature whereby if an email is received from an email address/domain name, a button or a link can be manually selected by a user to have the email address of the received email added to either a blacklist or a whitelist, that is to block or to allow email from that address in the future. In other cases, programs exist to mass-manage a large number of email and domain addresses and automatically blacklist or whitelist them. In either case, a user must still examine the email address and domain name of the received email to determine whether the email address/domain name should be whitelisted or blacklisted. There are also email programs that include a predefined, but regularly updated, list of email addresses/domain names that are known to be sources of spam email. When using such an email program, when a received email includes an address/domain name that matches an entry on the spam list, the received email is automatically blacklisted for the user by the email program.

However, there are times when a user is performing an online activity, such as making an online purchase on a website or registering for a blog, a newsletter or an online forum, such that the user desires and expects to receive emails from that site/domain. Unless the user adds the email address/domain name of that website manually to the whitelist of their email program or browser, emails from that source may end up being automatically tagged as spam, automatically added to their email blacklist, and unnecessarily blocked from being received in the future. Also, the user may not anticipate that an email address may be from a domain different from that of the actual website which was visited by the user, while still desiring to receive email from that other domain. Therefore, for at least this situation, a novel email spam control solution is needed.

SUMMARY OF THE INVENTION

Disclosed is a system and method to control email whitelists which enables a user of a web browser, an email application, and/or an email application whitelist, to detect and collect one or more website email addresses parsed from a web page, to detect whether one or more of the user's email addresses are included in a webform of the web page in response to a submission of the webform on the web page, to confirm whether to add the one or more site email addresses to one or more email whitelists in response to one or more of the user's email addresses being included in the submitted webform, and to update the configuration of the one or more whitelists in response to a confirmation to add the one or more site email addresses to the one or more email whitelists.

The present invention includes a feature which monitors a user's activity within a plug-in, or browser. If the user visits a page that contains a webform along with website email addresses that can be parsed (even hidden addresses), and the user types in the user's email address in the webform, for example, to subscribe to a blog or an email newsletter, to make a purchase, etc., and submits the webform at the web page, then the system and method of the present invention will detect those conditions and provide a feature to update the email application whitelist (even remote whitelists) for any email addresses confirmed to be added to the whitelist.

An additional feature of the present invention is that a third party service provider, such as an internet service provider (ISP), an email service provider (especially in webmail embodiments), or an organizational firewall can be notified, such that these third party services may receive confirmation information from the user's email program, plug-in or browser to help the third party maintain its own respective whitelist for its clients (i.e. the whitelisting feature of the present invention may not only extend to the local email client, but may also extend to higher-level "blocking" entities).

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
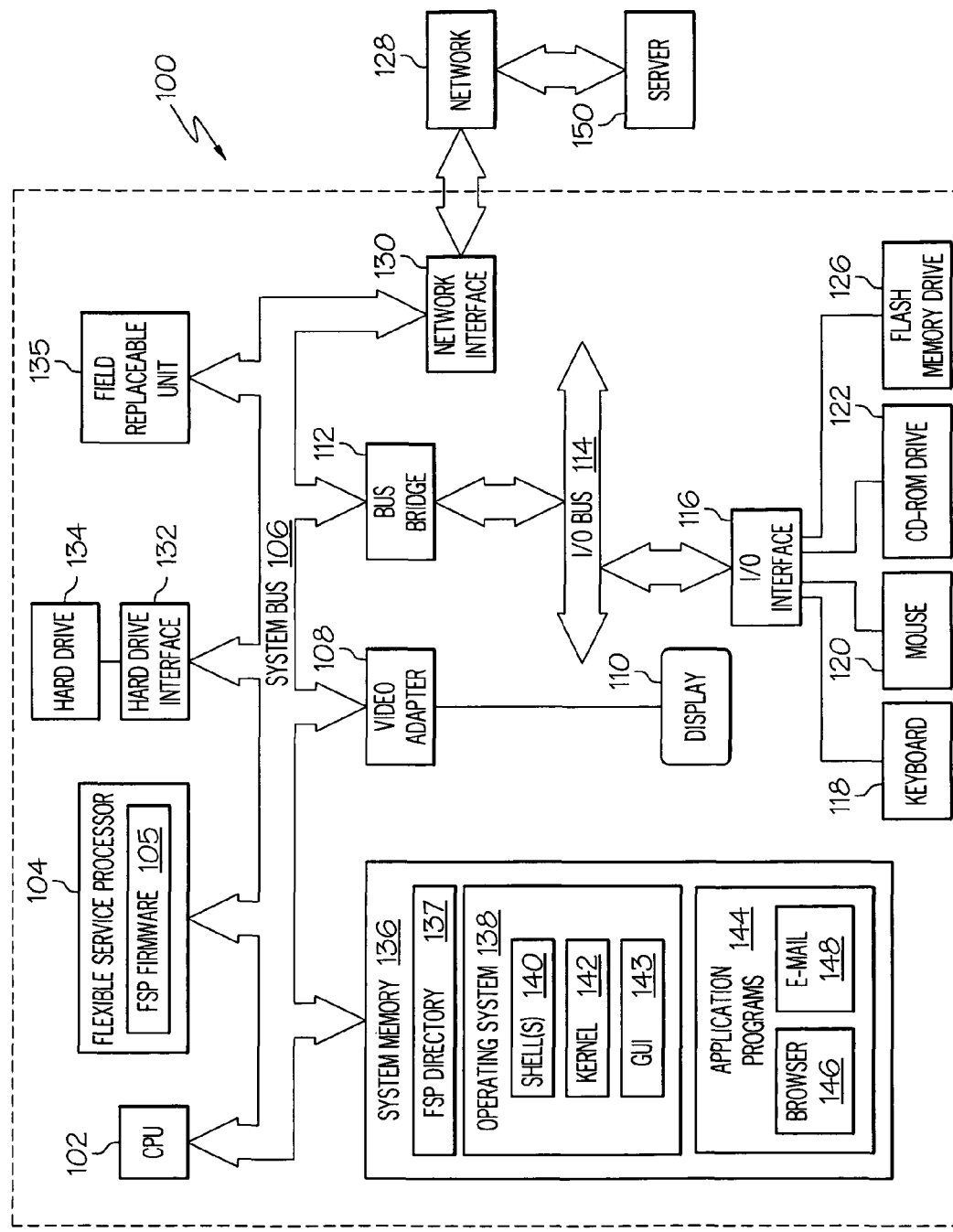
FIG. 1 depicts a high level block diagram of an embodiment of a computer and computer network, according to an embodiment of the present invention.

The present invention provides a system and method to control email whitelists. A user of a web browser, an email application, and/or an email application whitelist, can add one or more website email addresses to an email whitelist using the present system and method which detects and collects one or more website email addresses parsed from a web page, detects whether one or more of the user's email addresses are included in a webform of the web page in response to a submission of the webform on the web page, confirming whether the collected one or more website email addresses are to be added to one or more email whitelists in response to one or more of the user's email addresses being included in the submitted webform, and updates the configuration of the one or more whitelists in response to a confirmation to add the one or more site email addresses to the one or more email whitelists.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1, and 2xx for FIG. 2, etc.). The specific numerals assigned to the elements are provided solely to aid in the description and not meant to imply any limitations (structural or functional) on the invention.

Referring to FIG. 1, there is depicted a block diagram of an exemplary computer network and computer 100, with which the email whitelist control system and method of the present invention may be utilized. Computer 100 includes central processing unit (CPU) 102, which is coupled to system bus 106. Computer 100 also includes flexible service processor (FSP) 104, which is coupled to system bus 106. FSP 104 includes FSP firmware 105.

Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including, but not limited to, Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In an embodiment, server 150 is configured similarly to computer 100.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes FSP directory 137, Operating System (OS) 138, and application programs 144.

OS 138 includes shell 140, for providing transparent user access to resources such as application programs 144. Generally, shell 140 (as it is called in UNIX®) is a program that provides an interpreter function and an interface between a user and the operating system. Shell 140 provides a system prompt, interprets commands entered by a user on keyboard 118, mouse 120, or other user input media, and sends the interpreted command(s) to the appropriate lower levels of the operating system (e.g., kernel 142) for processing. As depicted, OS 138 also includes Graphical User Interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management. OS 138 may provide a GUI, a dialog box, or a pop-up window using display 110 to enable a user of computer 100 to select one or more website email address to be added to one or more email whitelist of the user, as described below in greater detail.

Application programs 144 may include a plug-in module, or web browser 146 and an email application 148. Browser 146 includes program modules and instructions enabling a World Wide Web (WWW) client (i.e., computer 100) to send and receive network messages to/from the Internet. Computer 100 may utilize HyperText Transfer Protocol (HTTP) messaging to enable communication with server 150. Email application 148 includes program modules, instructions, and one or more associated whitelists, such that a user of email application 148 is enabled to send/receive email via the Internet, or WWW in webmail embodiments, and to update the one or more associated whitelists with one or more website email addresses, as described below in more detail.

Figure 2:
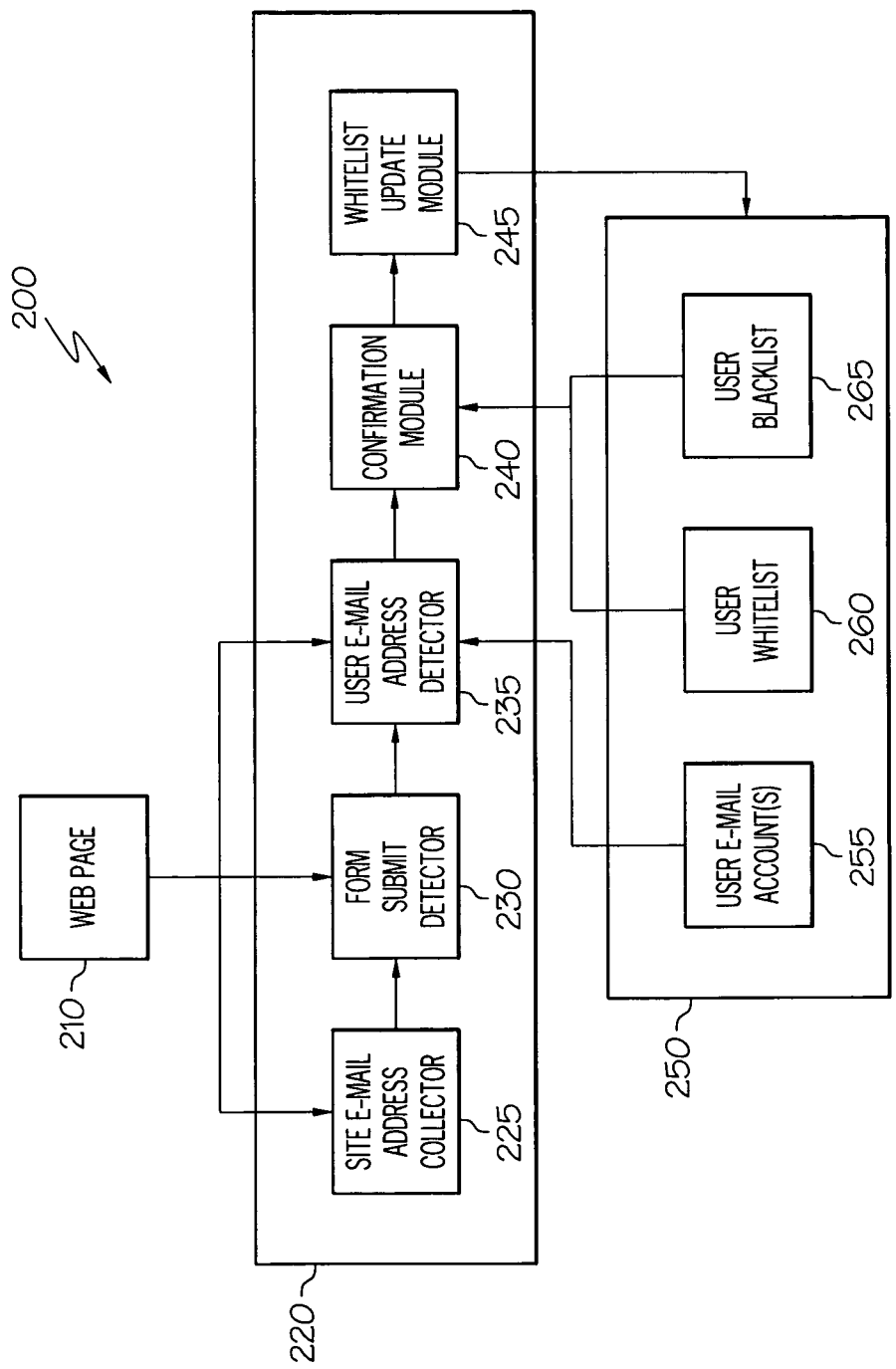
FIG. 2 is a block diagram depicting features of an embodiment of the whitelist control system, according to the present invention.

Referring to FIG. 2, functional blocks of an embodiment of the email whitelist control system 200 of the present invention are depicted. The email whitelist control system 200 includes a web browser, or plug-in, module 220 and an email system 250. The web browser module 220 includes a website, or site, email address collector 225, a form submit detector 230, a user email address detector 235, a confirmation module 240 and a whitelist update module 245. The email system 250 includes a user email account(s) module 255, a user whitelist 260 and a user blacklist 265.

The site email address collector 225 determines one or more email addresses associated with a site or a subscription service, or determines any other email address that may be used by the site owner, or by a respective delegate, which is used to communicate via email with a user at a user's email address. Often this takes the form of an email address purposed for marketing, support, for confirming a form submission or a transaction, for automated surveys, or for any other type of follow-up communication with the user. The email address may be from the same domain as the web server used by the site, or by the delegate.

The detection of one or more of a site's email addresses may be determined by the site email address collector 225 which parses the web page 210 of the site for any email address appearing in displayed text, by parsing the web page 210 for any email address appearing in hidden text, parsing the web page 210 for any email address appearing in an agreed upon meta tag, by accepting manual input from a user or other users or groups (such as via a social networking service which may provide the user with recommendations of "accepted" site email addresses), and/or by using the domain name of the web server for the site or of an affiliate (which may have an implied wild card format for the user name and/or sub-domains, for example subdomain.domain.com). The wild card format referred to herein may be replaced and/or enhanced with other text identifier conventions such as, for example, regular expressions.

For processing efficiency, the site email address collector 225 may begin by detecting if the web page 210 includes a webform, such as, for example, by searching for the <form> HTML tag. If no webform is detected, the site email address collector 225 may terminate processing because a site email address will not be considered in the absence of a webform.

Additionally, the detected one or more email addresses may be assigned weighting values, to give a priority rating to be used to help determine whether to ultimately add the detected one or more email addresses to an email whitelist, and to indicate a likelihood of the use of the respective detected email address in a future communication with the user. For example, an email address appearing in an agreed upon meta tag on the web page 210 may be given a high weighting value, an email address appearing in displayed text between a form's open and close tags may be given a medium weighting value, and an email address appearing near the end of the web page, such as in a footer, may be given a low weighting value. In general, the closer in proximity text which includes an email address is located on the web page 210 with respect to the relevant webform, the greater the weighting value which is assigned to the located email address.

A known method to determine a site email address utilizes parsing the web page 210 for three or more non-spaced strings separated by one or more periods and one "@" character. For example, a known method searches the web page 210 to determine whether the web page 210 includes at least a period after an "@" character. In another known method, text of the web page 210 is parsed to determine whether email addresses are located therein which are buried, or obscured, such as with spaces or a notation to symbolize required email components, such as text including <dot> instead of a "." character or <at> instead of the "@" character. Actual email addresses are often obscured in such a manner to prevent so-called "web robots", or "bots", from automatically collecting email addresses to add to spam lists.

Consider the following HTML code as an example of an agreed upon meta tag that could be implemented and agreed upon by web sites, social web site tagging services, and/or providers of email applications and web browsers.

```
< html>
    < head>
        < meta name="SUBSCRIPTION-ADDRESS"
        content="marketing@domain1.com;sales@domain2.com;order-
        confirmation@domain1.com" />
    </head>
    < etc tags>etc. content</etc tags>
</html>
```

In the above example, the agreed upon convention would be to use the depicted meta tag which includes the meta name "SUBSCRIPTION-ADDRESS". This example also demonstrates the registration of three hypothetical email addresses from two different hypothetical domains.

After at least one site email address is collected by the site email address collector 225, the form submit detector 230 monitors the relevant webform to determine when the webform has been submitted by the user. Typically, a webform is submitted when a user manually selects a button on the web page 210 to indicate that the webform is to be submitted, presses the "enter" key, or by any by other means, such as through JavaScript, or known plug-in methods.

The user email address detector 235 automatically detects if a user's email address appears on a submitted form. The user's email address can be one or more addresses as queried from the user's email account(s) 255 in the user's email system 250. In another embodiment, the user may manually input the user's email address into a preference field in a browser or email application. For simplicity, email addresses may be described herein in the singular, however, it should be understood that multiple email addresses are detected by the user email address detector 235 if the user has multiple email accounts associated with user email account(s) block 255.

The user email address detector 235 detects a user's email address by parsing a single text field of the webform of web page 210 that contains a match with the user's email address, and/or by parsing more than one field of the webform for text values that combine to contain a match with the user's email address. For an example of the former, consider where web page 210 includes a text box wherein a user can type his/her email address.

Where a plurality of data fields of the webform of the web page 210 is parsed to search for the user's email address, where the data fields may be distinct and separate data fields, the user email address detector 235 may concatenate combinations of text from the plurality of fields on the webform until a match with the user's email address is found, or until the entire text has been searched without finding a match. For example, on certain websites, such as, for example, a web page 210 may include a log on to a wireless access points, such as a Wi-fi® wireless access point. A user may enter in a first field the user name associated with their email address and then may select at another location of the web page 210 a domain to use in association with the user name from among a plurality of domain names displayed on the web page 210 grouped together as a selection list, or as a group of selection buttons or radio buttons, where the selection list or group of radio buttons each includes multiple domain names. This situation may occur, for example, when logging on to certain wireless access points, and a user who is a subscriber of services from the operator or partner of the wireless access point, as determined by the user's email address domain name, may login for free, or for a reduced fee.

The confirmation module 240 determines whether one or more of any collected site email address is to be added to the user whitelist 260, which is associated with the user. Prior to considering whether to add a collected email address to the whitelist 260, the existing user whitelist 260 is queried to determine if the collected site email address already exists in the user whitelist 260, such as via an exact match and/or via a domain name match.

For example, where the user whitelist 260 already includes the domain "*@example.com", this indicates that a permission has been given by the user, via a user preference or otherwise, that any site email address which includes any user name associated with the domain name "example.com" (since the wild card character "*" for the username has been included) will be allowed to be received by the user. In such a case, a match of any site email address which includes the domain "example.com" will not be added to the user whitelist 260, since the domain "example.com" is already included in the user whitelist 260 irrespective of the associated username. Collected site email addresses which include the domain "example.com" are dropped from consideration and will not be added to the user whitelist 260. Similarly, once a site email address is collected, the confirmation module 240 may query a user blacklist 265 associated with the user email account(s) 255 of the user to determine if any collected site email address should be dropped from consideration, or, preferably, flagged to the user as being previously blacklisted.

If the domain of the previously blacklisted email address has been previously stored in the user blacklist 265 using a wildcard format, as previously described, such that a collected email which includes any user name associated with that previously blacklisted domain name would be prevented from being received by the user, the user may be queried by the confirmation module 240 as to whether the user indeed desires to have that collected email address blocked, or whether the user desires to nonetheless allow the specific collected email address which includes the specific collected user name associated with that previously blacklisted domain name to be added to the user whitelist 260.

Confirmation of a collected site email address under consideration is provided by the confirmation module 240 causing the collected site email address to be added to the user whitelist 260 or blocked from being added to the user whitelist 260 by displaying the collected site email to the user for manual selection and determined action by the user, by the confirmation module 240 automatically processing the collected site email address such that the email address is added or not added to the user whitelist 260 depending upon a notification or response from a query sent by the confirmation module 240 to a third party service provider (such as a certifying body, a corporate whitelist/blacklist, a social computing service, etc.), and/or automatically processing the collected site email address such that the email address is added or not added to the user whitelist 260 depending upon a previously selected, or a default, user preference associated with the user in the user email account(s) module 255. A plurality of collected site email addresses may be displayed to the user as a list.

By displaying the collected site email address, or the list, the user can easily choose to allow, or to not allow, a site email address to be added to the user whitelist 260. As a user preference function, the confirmation module 240 may also allow the user to opt to automatically process any future collected site email addresses which match the previously collected and processed site email address in the same manner. As examples of other user preference functions, the confirmation module 240 may be configured by the user to always block a default collection of domain names when user name wild carding is used as a user preference, to block or allow collected site email addresses that match a domain name in the user's browser bookmark data file, to block or allow collected site email addresses from a specified web service subscription, to block or allow collected site email addresses from specific users or domain names, to block or accept all collected site email addresses, and/or to block or accept collected site email addresses based on external conditions (such as while using a specific browser, during certain times of the day or days of the week, while a measurable location is at work or home, etc.).

A graphic user interface (GUI), for example the GUI 143 of FIG. 1, may be displayed to the user according to any known convention, such as a pop-up box, a launched window, a status bar animation, etc. A GUI used by a user to establish or edit preferences may also be implemented according to any known convention, such as known preference dialogs or wizards (i.e., a guided series of one or more preference dialogs).

Any activity performed by the confirmation module 240 may be performed to not block the ultimate submission or processing of a webform of the web page 210. In other words, although actions by the confirmation module 240 may cause a slight delay in the submission of the webform, the submission of the webform may not be blocked by the present invention. The actual blocking of the submission of a webform can be accomplished by other known methods.

In another embodiment, the confirmation module 240 may be invoked after, or as a separate process to, the webform submission or processing, and therefore result in no delay of the webform submission. In a further embodiment, if a site email address is determined to be in the user blacklist 265, the confirmation module 240 may enable a user to block the webform submission. A user may want to reconsider a webform submission upon discovering that a site email address is on their user blacklist 265.

The whitelist update module 245 may integrate with and update the user whitelist 260, the user's configuration of whitelist software, or the email application 148 which includes an embedded whitelist feature. Specifically, the whitelist update module 245 adds any confirmed site email address to the respective whitelist configuration. In an embodiment, this includes a mechanism such as a whitelist text file that may be edited by the whitelist update module 245, or includes an API that can be used to add to the respective whitelist configuration, or includes an structured query language (SQL) or other command to instruct the respective whitelist or whitelist software to add the confirmed site email address.

In an embodiment which includes no direct automatic addition by the whitelist update module 245 of the confirmed site email addresses to the user whitelist 260, the whitelist update module 245 can instead launch a respective whitelist software or the email application 148 which includes an embedded whitelist feature to perform the actual addition of the confirmed site email address to the respective whitelist. Thus, in such an embodiment, the whitelist update module 245 can either simply provide user key stroke signals to be used to initiate and launch the respective whitelist software or the email application 148, or can allow a user to manually enter a displayed and confirmed site email address(es) such that it is added to a whitelist.

The web page 210 of the email whitelist control system 200 may be stored within a web server, such as, for example, the server 150 of FIG. 1. The web browser, or plug-in, module 220 may be included as part of a browser application, such as the browser 146 and/or the email application 148 of FIG. 1. The email system 250 may be included as part of a browser application, such as the browser 146 and/or the email application 148 of FIG. 1, and the user email account(s) module 255, the user whitelist 260 and the user blacklist 265 may each be configured and stored as a database associated with the browser 146 and/or the email application 148, or may be stored on a server of a third party service provider.

In another embodiment, the site email address collector 225 and the form submit detector 230 may be switched in the order depicted in FIG. 2. In such an embodiment, the form submit detector 230 may utilize the caching of the web page 210, or may pause the actual submission of the webform to the web server so that the site email address collector 225 has sufficient time to process the web page 210. In a further embodiment, the user email address detector 235 and the site email address collector 225 may be switched from the order as depicted in FIG. 2.

Using the present invention, a whitelist maintained by a third party ISP or email host (such as a government agency, a corporation, or a central service or other public provider of email services) may also be notified (as a report, or otherwise) by the confirmation module 240 or the whitelist update module 245 of the confirmed site email address and/or that the collected site email address is to be added to the user whitelist 260, and algorithms can be applied to be utilized with the present invention such that the third party whitelists may be amended if sufficient notifications/reports are received, or the authority/reliability of a user sending the notification/reports has been established with the third parties.

In an embodiment of the present invention, whitelist update actions are logged by storing a record of the site web server which provides the web page 210, the web page 210 itself, and/or the webform name; webform details such as field names and values; the date and time of the webform submission; and/or the website email address.

In general, a user may have multiple email systems, each containing their own or, in some environments, a shared user email whitelist. Using the present invention, a user does not need to manually add each confirmed site email address to the user's email whitelist, such as, for example, by typing the email address in a "Safe Sender", or similar, field used by current email applications in a "tools" menu or elsewhere.

Figure 3:
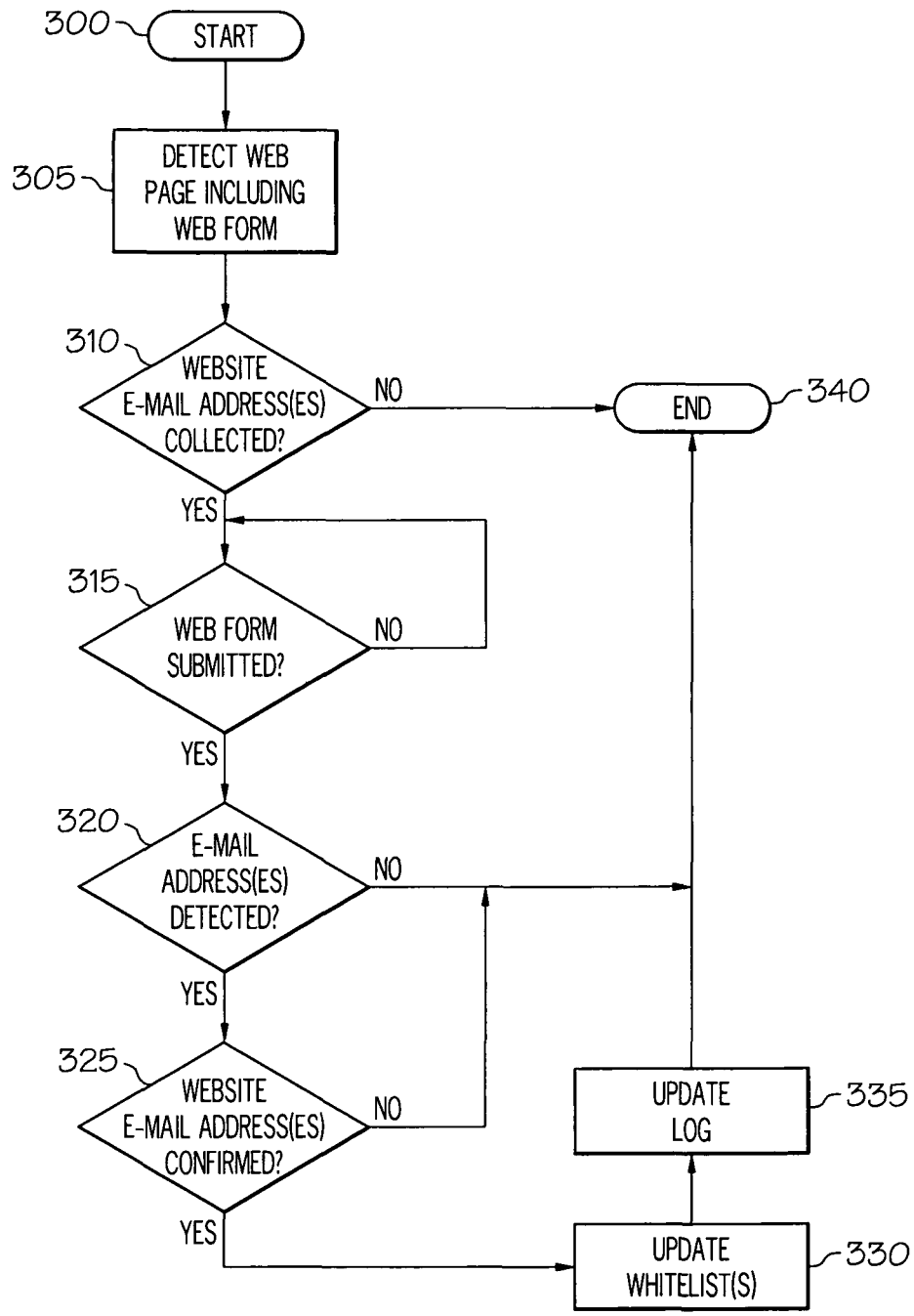
FIG. 3 is a high level logical flowchart of an embodiment of the whitelist control method, according to the present invention.

Referring to FIG. 3, there is illustrated a high level logical flowchart of an embodiment of the present invention. In the flow chart of FIG. 3, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

The email whitelist control system 200 of the present invention is initiated and detects a web page which includes a webform using a web browser application, at blocks 300 and 305 of FIG. 3. At block 310, the site email address collector 225 attempts to collect at least one web site email address. If no such site email address is collected, the process terminates at block 340. If at least one site email address is collected, at block 315 a determination is made by the form submit detector 230 as to whether a webform has been submitted. If not, the process continues to wait at block 315 until such a webform is submitted or the web page 210 is closed. If a webform is detected as being submitted, at block 320 a determination is made as to whether a user email address has been detected by the user email address detector 235. If not, the process terminates at block 340. If so, at block 325 a determination is made as to whether at least one site email address has been confirmed by the confirmation module 240.

If at least one site email address has not been confirmed by the confirmation module 240 after the webform has been submitted, the process terminates at block 340. If so, at block 330 at least one user email whitelist is updated. At block 335, an update log is updated with information regarding the web server, the web page, the webform name, etc., as described above. Once the updating of the update log is completed, the process terminates at block 340.

It is understood that the use herein of specific names are for example only and not meant to imply any limitations on the invention. The invention may thus be implemented with different nomenclature/terminology and associated functionality utilized to describe the above devices/utility, etc., without limitation. While the present invention has been particularly shown and described with reference to a preferred embodiment, it will be understood by those skilled in the art that various changes in form and detail may be made therein without departing from the spirit and scope of the invention. Furthermore, as utilized in the specification and the appended claims, the term "computer" or "system" or "computer system" or "computing device" includes any data processing system including, but not limited to, personal computers, servers, workstations, network computers, main frame computers, routers, switches, personal digital assistants (PDAs), telephones, and any other system capable of processing, transmitting, receiving, capturing, and/or storing data.

It should be understood that at least some aspects and utilities of the present invention may alternatively be implemented in a computer-readable storage medium that contains a program product. That is, the present invention can also be embodied as programs defining functions in the present invention as computer-readable codes on a computer-readable storage medium. The computer-readable storage medium may be a computer-readable recording medium or a computer-readable/writeable recording medium. The computer-readable storage medium is any tangible data storage device that can store data which can be thereafter read by a computer system. Examples of a computer-readable recording medium include read-only memory (ROM), and examples of a computer-readable/writeable recording medium include random-access memory (RAM), CD-ROMs, magnetic tapes, floppy disks, hard disk drives, memory stick devices, and optical data storage devices. The computer-readable storage medium can also be distributed over network coupled computer systems so that the computer-readable code is stored and executed in a distributed fashion. Also, functional programs, codes, and code segments to accomplish the present invention can be easily construed by programmers skilled in the art to which the present invention pertains. Further, it is understood that the present invention may be implemented as a system having means in the form of hardware, software, or a combination of software and hardware as described herein, or their equivalents.

What is claimed is:

1. A method of controlling an email whitelist, the method comprising the steps of:
   a computer detecting a webform on a web page, and in response, the computer collecting an email address from the web page, the collected email address for communicating via email with a website user or a subscription service user;
   the computer detecting a submission of the webform, and in response, the computer detecting whether a user email address is included in the webform;
   the computer determining that the collected email address is to be added to an email whitelist of an email system associated with the user email address, and in response, the computer updating a configuration of the email whitelist of the email system, wherein the step of the computer updating the configuration of the email whitelist of the email system comprises the computer adding the collected website email address to the email whitelist of the email system;
   the computer collecting a second email address from the web page, the collected second email address for communicating via email with a website user or a subscription service user;
   the computer determining that the collected second email address is on an email blacklist of the email system, and in response, the computer performing one of:
   dropping the collected second email address from being added to the email whitelist of the email system; and
   flagging the collected second email address as being previously blacklisted, generating a query to determine whether a user desires to have the collected second email address blocked or to have the collected second email address added to the email whitelist of the email system, and processing the collected second email address based on a response to the query.

2. The method of claim 1, wherein the step of the computer collecting the email address from the web page comprises the computer parsing the email address from the web page.

3. The method of claim 1, further comprising the steps of:
   the computer assigning a weighted value to the collected email address, the weighted value indicating a likelihood that the collected email address will be utilized in future communication with the email system; and
   before the step of the computer adding the collected email address to the email whitelist of the email system, the computer determining whether to add the collected email address to the email whitelist of the email system based on the weighted value assigned to the collected email address.

4. The method of claim 1, wherein:
   the step of the computer determining that the collected email address is to be added to the email whitelist of the email system is in response to the step of the computer detecting whether the user email address is included in the webform; and
   the step of the computer detecting whether the user email address is included in the webform comprises the computer parsing one or more text fields of the webform for an email address that matches an email address of an account in the email system.

5. The method of claim 1, wherein the step of the computer determining that the collected website email address is to be added to the email whitelist of the email system comprises at least one of the computer receiving a notification from, and the computer providing a notification to, a third party whitelist in regard to the collected email address.

6. The method of claim 1, further comprising the step of:
before the step of the computer determining that the collected email address is to be added to the email whitelist of the email system, the computer querying the email whitelist of the email system to determine whether the collected email address is included in the email whitelist of the email system; and
wherein the step of the computer adding the collected email address to the email whitelist of the email system comprises the computer adding the collected email address to the email whitelist of the email system only if the collected email address is not already on the email whitelist of the email system.

7. The method of claim 2, wherein the step of the computer parsing the email address from the web page comprises the computer parsing the web page for one or more of: an email address appearing in displayed text, an email address appearing in hidden text, and an email address appearing in a meta tag.

8. The method of claim 1, further comprising the steps of:
the computer collecting a third email address from the web page, the collected third email address for communicating via email with a website user or a subscription service user; and
the computer determining that the collected third email address is on an email blacklist of the email system, and in response, the computer enabling the submission of the webform to be blocked, thereby allowing a user to reconsider submitting the webform.

9. A computer system comprising:
a computer-readable tangible storage device, a processor, and a computer-readable memory;
program instructions, stored on the storage device for execution by the processor via the memory, to detect a webform on a web page, and in response, to collect an email address from the web page, the collected email address for communicating via email with a website user or a subscription service user;
program instructions, stored on the storage device for execution by the processor via the memory, to detect a submission of the webform, and in response, to detect whether a user email address is included in the webform;
program instructions, stored on the storage device for execution by the processor via the memory, to determine that the collected website email address is to be added to an email whitelist of an email system associated with the user email address, and in response, to update a configuration of the email whitelist of the email system, wherein the program instructions to update the configuration of the email whitelist of the email system add the collected email address to the email whitelist of the email system;
program instructions, stored on the storage device for execution by the processor via the memory, to determine that the collected email address is not included on an email blacklist of the email system, and in response, to add the collected email address to the email whitelist of the email system only if the collected email address is not already on the email whitelist of the email system; and
program instructions, stored on the storage device for execution by the processor via the memory, to determine that the collected email address is on the email blacklist, and in response, to:
drop the collected email address from being added to the email whitelist of the email system; or
flag the collected email address as being previously blacklisted, generate a query to determine whether a user desires to have the collected email address blocked or to have the collected email address added to the email whitelist of the email system, and process the collected email address based on a response to the query.

10. The computer system of claim 9, wherein the program instructions to collect the email address parse the email address from the web page.

11. The computer system of claim 9, wherein:
the program instructions to determine that the collected email address is to be added to the email whitelist of the email system determine whether the collected email address is to be added to the email whitelist of the email system in response to detecting whether the user email addresses is included in the webform; and
the program instructions to detect whether the user email address is included in the webform parse one or more text fields of the webform for an email address that matches an email address of an account in the email system.

12. The computer system of claim 9, further comprising:
program instructions, stored on the storage device for execution by the processor via the memory, to assign a weighted value to the collected email address, the weighted value indicating a likelihood that the collected email address will be utilized in future communication with the email system; and
program instructions, stored on the storage device for execution by the processor via the memory, to determine whether to add the collected email address to the email whitelist of the email system based on the weighted value assigned to the collected email address.

13. The computer system of claim 9, wherein the program instructions to determine that the collected email address is to be added to the email whitelist of the email system receive a notification from, or provide a notification to, a third party whitelist in regard to the collected email address.

14. The computer system of claim 10, wherein the program instructions to parse the email address from the web page parse the web page for one or more of: an email address appearing in displayed text, an email address appearing in hidden text, and an email address appearing in a meta tag.

15. The computer system of claim 9, further comprising program instructions, stored on the storage device for execution by the processor via the memory, to determine that the collected email address is on an email blacklist of the email system, and in response, to enable the submission of the webform to be blocked, thereby allowing a user to reconsider submitting the webform.

16. A computer program product embodied on a non-transitory computer-readable tangible storage device comprising:
program instructions, stored on the storage device, to detect a webform on a web page, and in response, to collect an email address from the web page, the collected email address for communicating via email with a website user or a subscription service user, wherein the program instructions to collect the email address from the web page parse the email address from the web page;
program instructions, stored on the storage device, to detect a submission of the webform, and in response, to detect whether a user email addresses is included in the webform;
program instructions, stored on the storage device, to determine that the collected email address is to be added to an email whitelist of an email system associated with the user email address, and in response, to update a configuration of the email whitelist of the email system, wherein the program instructions to update the configuration of the email whitelist of the email system add the collected email address to the email whitelist of the email system; and program instructions, stored on the storage device, to determine that the collected email address is not included on an email blacklist of the email system, and in response, to add the collected email address to the email whitelist of the email system only if the collected email address is not already on the email whitelist of the email system; and program instructions, stored on the storage device, to determine that the collected email address is on the email blacklist, and in response, to:
 drop the collected email address from being added to the email whitelist of the email system; or
 flag the collected email address as being previously blacklisted, generate a query to determine whether a user desires to have the collected email address blocked or to have the collected email address added to the email whitelist of the email system, and process the collected email address based on a response to the query.

17. The computer program product of claim 16, further comprising: program instructions, stored on the storage device, to determine that the collected email address is on an email blacklist of the email system, and in response to enable the submission of the webform to be blocked, thereby allowing a user to reconsider submitting the webform.

* * * * *